United States Patent
Park et al.

(10) Patent No.: US 10,568,116 B2
(45) Date of Patent: Feb. 18, 2020

(54) METHOD FOR TRANSMITTING SIGNAL IN WIRELESS COMMUNICATION SYSTEM, AND APPARATUS THEREFOR

(71) Applicant: LG ELECTRONICS INC., Seoul (KR)

(72) Inventors: Hanjun Park, Seoul (KR); Joonkui Ahn, Seoul (KR); Seungmin Lee, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 11 days.

(21) Appl. No.: 15/552,431

(22) PCT Filed: Mar. 4, 2016

(86) PCT No.: PCT/KR2016/002185
§ 371 (c)(1),
(2) Date: Aug. 21, 2017

(87) PCT Pub. No.: WO2016/144050
PCT Pub. Date: Sep. 15, 2016

(65) Prior Publication Data
US 2018/0049221 A1    Feb. 15, 2018

Related U.S. Application Data

(60) Provisional application No. 62/129,042, filed on Mar. 6, 2015.

(51) Int. Cl.
H04W 4/00    (2018.01)
H04W 72/12    (2009.01)
(Continued)

(52) U.S. Cl.
CPC ....... *H04W 72/1247* (2013.01); *H04W 48/20* (2013.01); *H04W 72/10* (2013.01); *H04W 74/08* (2013.01); *H04W 48/16* (2013.01)

(58) Field of Classification Search
None
See application file for complete search history.

(56) References Cited

U.S. PATENT DOCUMENTS

2013/0051374 A1*    2/2013    Faurie ............... H04W 72/0446
                                                              370/337
2014/0010089 A1*    1/2014    Cai ........................ H04W 48/16
                                                              370/241
(Continued)

FOREIGN PATENT DOCUMENTS

WO    WO 2013/154401 A1    10/2013
WO    WO 2014/027847 A1    2/2014
(Continued)

*Primary Examiner* — Gerald A Smarth
(74) *Attorney, Agent, or Firm* — Birch, Stewart, Kolasch & Birch, LLP

(57) ABSTRACT

A method for transmitting a signal in an unlicensed band in a wireless communication system according to one embodiment of the present invention is performed by a transmission node and comprising the steps of: receiving information about additional channel sensing from a center node; performing channel sensing for signal transmission during a first time period; when the channel is in an unoccupied state as a result of the channel sensing, performing additional channel sensing during a second time period immediately following the first time period according to the information about the additional channel sensing, the length of the second time period being determined according to a transmission priority level of the transmission node; and when the channel is in an unoccupied state as a result of the additional channel sensing, transmitting a signal.

16 Claims, 12 Drawing Sheets

(51) Int. Cl.
  *H04W 74/08*  (2009.01)
  *H04W 48/20*  (2009.01)
  *H04W 72/10*  (2009.01)
  *H04W 48/16*  (2009.01)

(56) References Cited

U.S. PATENT DOCUMENTS

| | | | |
|---|---|---|---|
| 2014/0334387 A1* | 11/2014 | Doppler | H04W 74/0816 370/329 |
| 2014/0342745 A1 | 11/2014 | Bhushan et al. | |
| 2015/0049712 A1* | 2/2015 | Chen | H04W 72/1215 370/329 |
| 2015/0289293 A1* | 10/2015 | Zhang | H04W 74/002 455/404.1 |
| 2016/0127098 A1* | 5/2016 | Ng | H04L 5/0048 370/329 |
| 2016/0128024 A1* | 5/2016 | Frederiks | H04W 72/04 370/329 |
| 2016/0143014 A1* | 5/2016 | Mukherjee | H04W 74/0816 370/330 |
| 2016/0150569 A1* | 5/2016 | Benveniste | H04L 47/14 370/315 |
| 2017/0006505 A1* | 1/2017 | Liu | H04W 28/26 |
| 2017/0231003 A1* | 8/2017 | Godana | H04W 74/0808 |
| 2017/0238311 A1* | 8/2017 | Hooli | H04W 74/0816 370/329 |
| 2017/0339588 A1* | 11/2017 | Moon | H04W 88/02 |
| 2018/0317246 A1* | 11/2018 | Mukherjee | H04W 74/0816 |

FOREIGN PATENT DOCUMENTS

| | | |
|---|---|---|
| WO | WO 2014/030983 A1 | 2/2014 |
| WO | WO 2014/178678 A1 | 11/2014 |

\* cited by examiner

METHOD FOR TRANSMITTING SIGNAL IN WIRELESS COMMUNICATION SYSTEM, AND APPARATUS THEREFOR

CROSS REFERENCE TO RELATED APPLICATIONS

This application is the National Phase of PCT International Application No. PCT/KR2016/002185, filed on Mar. 4, 2016, which claims priority under 35 U.S.C. 119(e) to U.S. Provisional Application No. 62/129,042, filed on Mar. 6, 2015, all of which are hereby expressly incorporated by reference into the present application.

TECHNICAL FIELD

The present invention relates to a wireless communication system, and more particularly, to a method of transmitting a signal in an unlicensed band and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE OF THE INVENTION

Technical Task

A technical task of the present invention is to provide a method of transmitting a signal in an unlicensed band.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting signal in an unlicensed band, which is transmitted by a transmission node in a wireless communication system, includes the receiving information on additional channel sensing from a center node, performing channel sensing for transmitting signal within a first time period, performing the additional channel sensing within a second time period immediately after the first time period according to the information on the additional channel sensing when a channel is in an unoccupied state as a result of the channel sensing, wherein the second time period has a length determined according to a transmission priority level of the transmission node, and transmitting the signal when a channel is in an unoccupied state as a result of the additional channel sensing.

Additionally or alternatively, the first time period can be configured to be after a prescribed time from a transmission allowed time period of a transmission node having a transmission priority level higher than the transmission priority level of the transmission node.

Additionally or alternatively, the length of the second time period may be configured in proportion to or in reverse proportion to a value of the transmission priority level of the transmission node.

Additionally or alternatively, the method may further include sequentially performing channel sensing in each of a plurality of the slots when the second time period consists of a plurality of slots, and transmitting the signal when a back-off counter value becomes 0.

Additionally or alternatively, the back-off counter value may be configured in proportion to or in reverse proportion to a value of the transmission priority level of the transmission node.

Additionally or alternatively, the method may further include the receiving information on a period for which signal transmission is restricted or information on a period for which channel sensing is restricted from the center node.

Additionally or alternatively, the period for which the signal transmission is restricted or the period for which the channel sensing is restricted may have a length and an interval configured in proportion to or in reverse proportion to a value of the transmission priority level of the transmission node.

Additionally or alternatively, the signal may be transmitted when a length of a minimum signal transmission period is secured according to information on the period for which the signal transmission is restricted.

Additionally or alternatively, when a signal to be transmitted by the transmission node corresponds to an uplink signal, if priority of the uplink signal is higher than priority of a downlink signal, a transmission timing of the uplink signal is advanced as much as a predetermined time offset. If the priority of the uplink signal is lower than the priority of the downlink signal, the transmission timing of the uplink signal may be delayed as much as the predetermined time offset.

To further achieve these and other advantages and in accordance with the purpose of the present invention, according to a different embodiment, a transmission node for transmitting a signal in an unlicensed band in a wireless communication system includes an radio frequency (RF) unit and a processor controls the RF unit, the processor receives information on additional channel sensing from a center node, performs channel sensing for transmitting a signal within a first time period, performs the additional channel sensing in a second time period immediately after the first time period according to the information on the additional channel sensing when a channel is in an unoccupied state as a result of the channel sensing, wherein the second time period has a length determined according to a transmission priority level of the transmission node, transmits the signal when a channel is in an unoccupied state as a result of the additional channel sensing.

Additionally or alternatively, the first time period may be configured to be after a prescribed time from a transmission allowed time period of a transmission node having a transmission priority level higher than the transmission priority level of the transmission node.

Additionally or alternatively, the length of the second time period may be configured in proportion to or in reverse proportion to a value of the transmission priority level of the transmission node.

Additionally or alternatively, the processor may sequentially performs channel sensing in each of a plurality of the slots when the second time period consists of a plurality of slots. Further, the processor may transmit the signal when a back-off counter value becomes 0.

Additionally or alternatively, the back-off counter value may be configured in proportion to or in reverse proportion to a value of the transmission priority level of the transmission node.

Additionally or alternatively, the processor may receive information on a period for which signal transmission is restricted or information on a period for which channel sensing is restricted from the center node.

Additionally or alternatively, the period for which the signal transmission is restricted or the period for which the channel sensing is restricted may have a length and an interval configured in proportion to or in reverse proportion to a value of the transmission priority level of the transmission node.

Additionally or alternatively, the processor may transmit the signal when a length of a minimum signal transmission period is secured according to information on the period for which the signal transmission is restricted.

Additionally or alternatively, when a signal to be transmitted by the transmission node corresponds to an uplink signal, if priority of the uplink signal is higher than priority of a downlink signal, a transmission timing of the uplink signal is advanced as much as a predetermined time offset. If the priority of the uplink signal is lower than the priority of the downlink signal, the transmission timing of the uplink signal may be delayed as much as the predetermined time offset.

Technical solutions obtainable from the present invention are non-limited the above-mentioned technical solutions. And, other unmentioned technical solutions may be clearly understood from the following description by those having ordinary skill in the technical field to which the present invention pertains.

Advantageous Effects

According to one embodiment of the present invention, it is able to efficiently transmit a signal in an unlicensed band.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
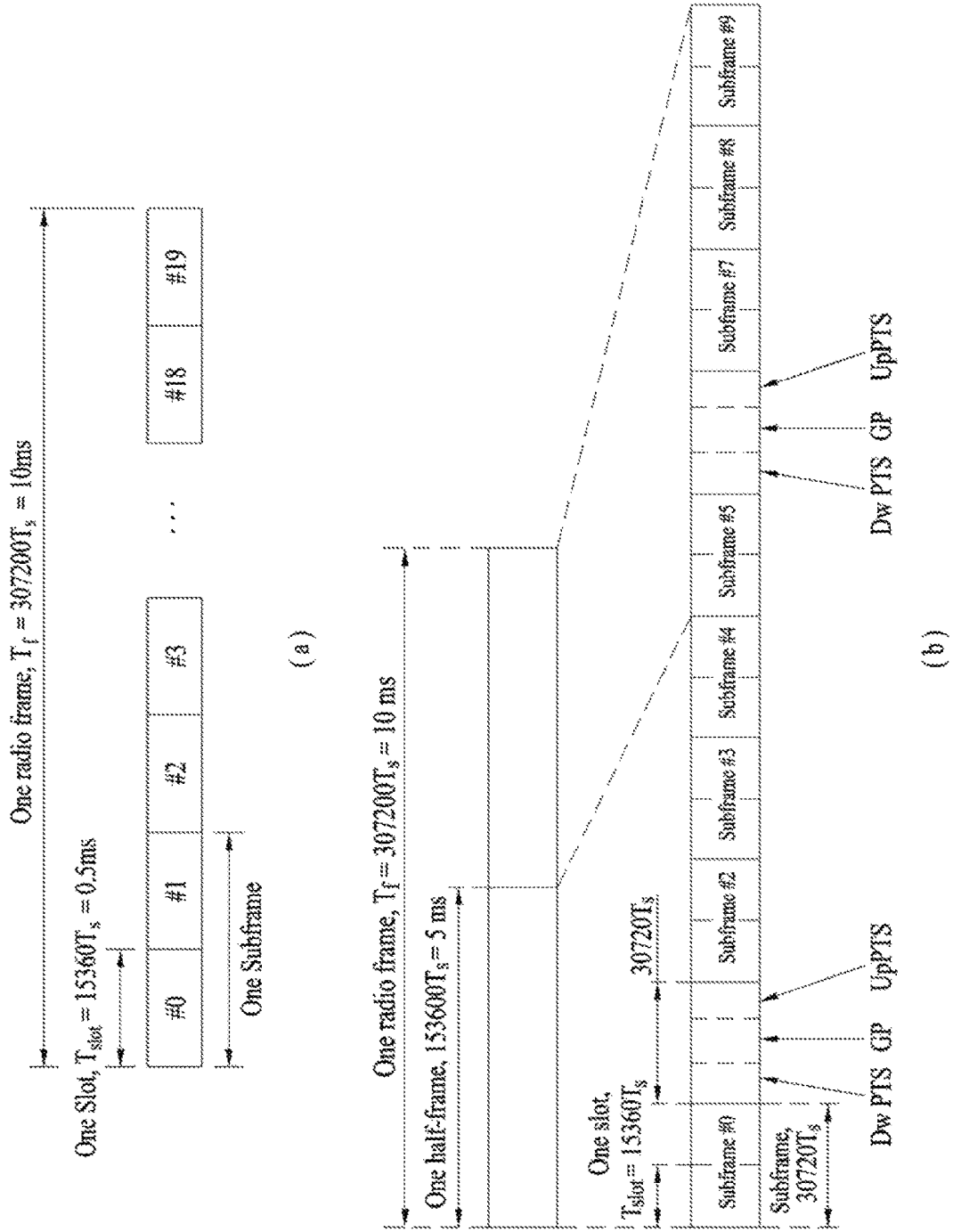
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
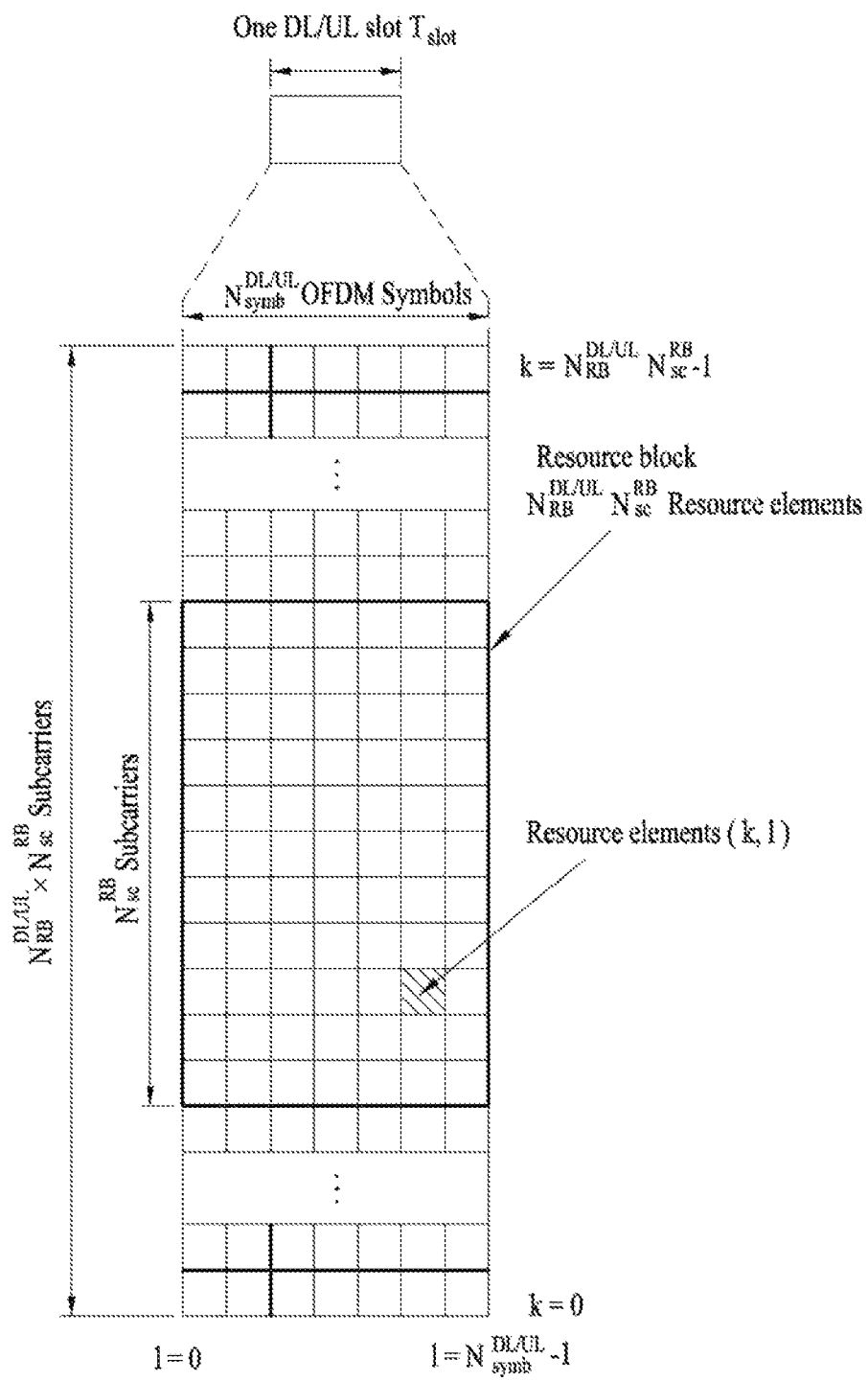
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
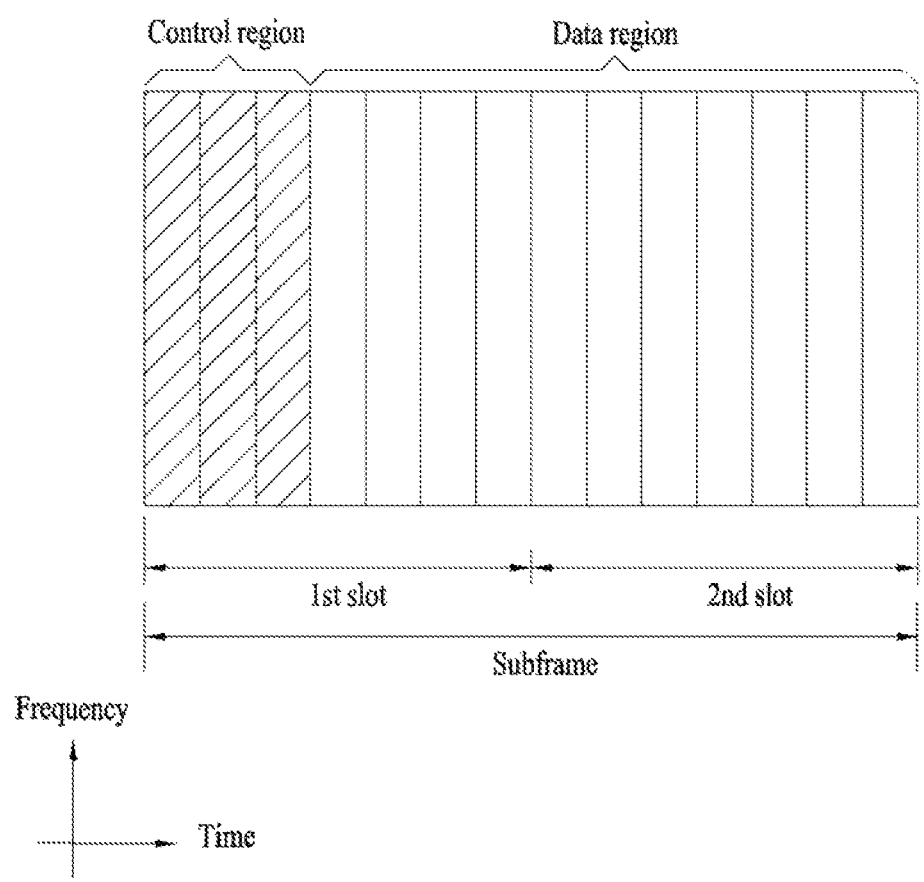
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH candidates |
|---|---|---|---|
| Type | Aggregation Level L | Size [in CCEs] | $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
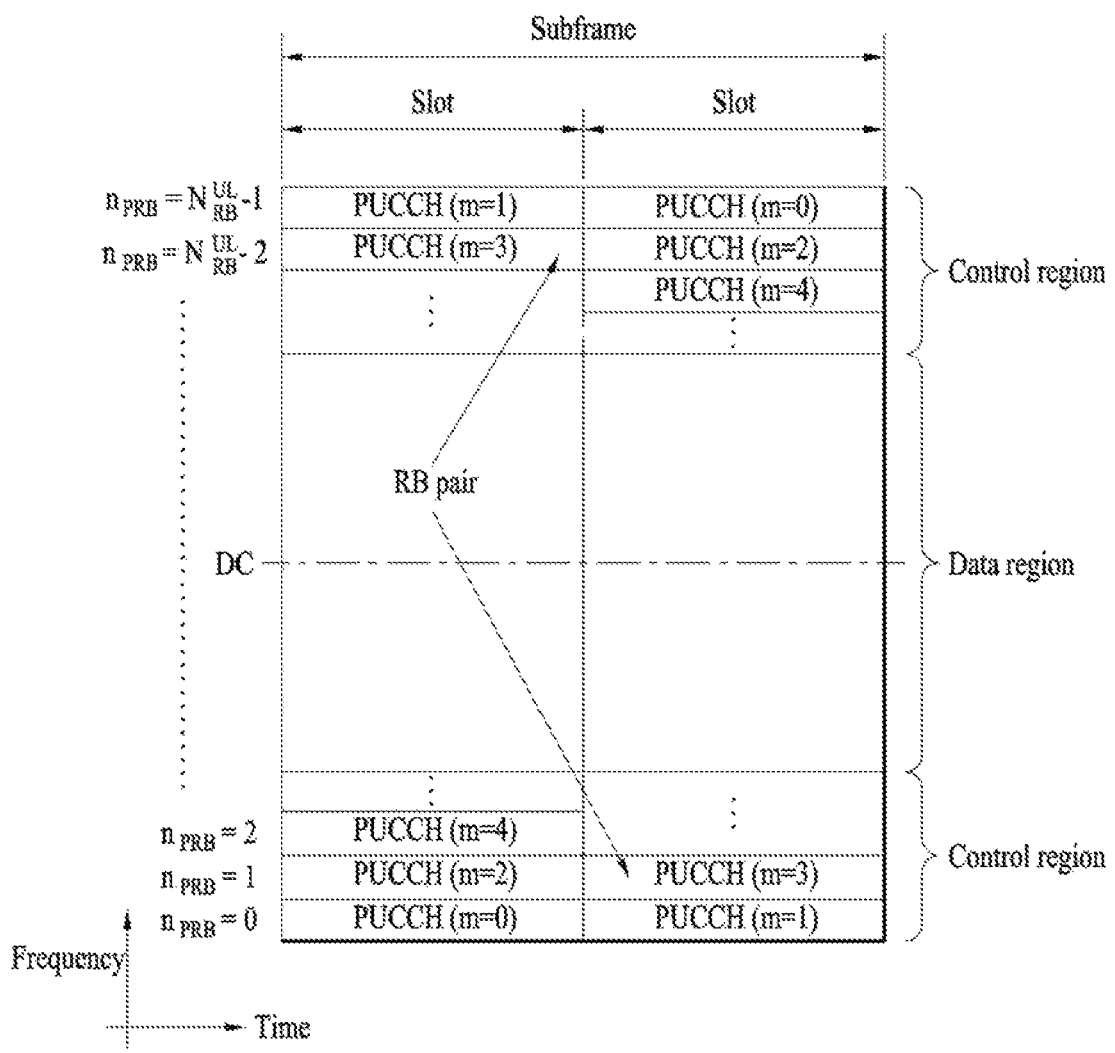
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

Meanwhile, in an LTE-A system which includes more accurate MU-MIMO and explicit CoMP operations, current CSI feedback is defined in LTE and thus may not sufficiently support operations to be newly introduced. As requirements for CSI feedback accuracy become more complex in order to obtain sufficient MU-MIMO or CoMP throughput gain, the PMI is composed of two PMIs such as a long term/wideband PMI (W1) and a short term/subband PMI (W2). In other words, a final PMI is expressed by a function of W1 and W2. For example, the final PMI W may be defined as follows: W=W1*W2 or W=W2*W1. Accordingly, in LTE-A, a CSI may be composed of RI, W1, W2 and CQI.

In the 3GPP LTE(-A) system, an uplink channel used for CSI transmission is shown in Table 5 below.

TABLE 5

| Scheduling scheme | Periodic CSI transmission | Aperiodic CSI transmission |
| --- | --- | --- |
| Frequency non-selective | PUCCH | — |
| Frequency selective | PUCCH | PUSCH |

Referring to Table 5, the CSI may be transmitted using a physical uplink control channel (PUCCH) with periodicity determined by a higher layer or may be aperiodically transmitted using a physical uplink shared channel (PUSCH) according to the demand of a scheduler. If the CSI is transmitted using the PUSCH, only frequency selective scheduling method and an aperiodic CSI transmission method are possible. Hereinafter, the scheduling scheme and a CSI transmission scheme according to periodicity will be described.

1) CQI/PMI/RI Transmission Via PUSCH after Receiving CSI Transmission Request Control Signal.

A control signal for requesting transmission of a CSI may be included in a PUSCH scheduling control signal (UL grant) transmitted via a PDCCH signal. Table 5 below shows the mode of the UE when the CQI, the PMI and the RI are transmitted via the PUSCH.

TABLE 6

| | | PMI Feedback Type | | |
| --- | --- | --- | --- | --- |
| | | No PMI | Single PMI | Multiple PMIs |
| PUSCH CQI Feedback Type | Wideband (Wideband CQI) | | | Mode 1-2 RI 1st wideband CQI (4 bit) 2nd wideband CQI (4 bit) if RI >1 N * Subband PMI (4 bit) (N is the total # of subbands) (if 8Tx Ant, N * subband W2 + wideband W1) |
| | UE selected (Subband CQI) | | Mode 2-0 RI (only for Open-loop SM) 1st wideband CQI (4 bit) + Best-M CQI (2 bit) (Best-M CQI: average CQI for selected M SB(s) among N SBs) Best-M index (L bit) | Mode 2-2 RI 1st wideband CQI (4 bit) + Best-M CQI (2 bit) 2nd wideband CQI (4 bit) + Best-M CQI (2 bit) if RI >1 Best-M index (L bit) Wideband PMI (4 bit) + Best-M |

TABLE 6-continued

| | PMI Feedback Type | | |
|---|---|---|---|
| | No PMI | Single PMI | Multiple PMIs |
| Higher Layer-configured (Subband CQI) | Mode 3-0<br>RI (only for Open-loop SM)<br>1st wideband CQI (4 bit) + N * subband CQI (2 bit) | Mode 3-1<br>RI<br>1st wideband CQI (4 bit) + N * subbandCQI (2 bit)<br>2nd wideband CQI (4 bit) + N * subbandCQI (2 bit) if RI >1<br>Wideband PMI (4 bit) (if 8Tx Ant, wideband W2 + wideband W1) | PMI (4 bit) (if 8Tx Ant, wideband W2 + Best-M W2 + wideband W1)<br>Mode 3-2<br>RI<br>1st wideband CQI (4 bit) + N * subbandCQI (2 bit)<br>2nd wideband CQI (4 bit) + N * subbandCQI (2 bit) if RI >1<br>N * Subband PMI (4 bit)<br>(N is the total # of subbands)<br>(if 8Tx Ant, N * subband W2 + wideband W1) |

The transmission mode of Table 6 is selected at a higher layer and the CQI/PMI/RI is transmitted in the same PUSCH subframe. Hereinafter, an uplink transmission method of the UE according to mode will be described.

Mode 1-2 indicates the case in which a precoding matrix is selected on the assumption that data is transmitted via only a subband with respect to each subband. The UE generates a CQI on the assumption that a precoding matrix is selected with respect to an entire set S specified by a higher layer or a system bandwidth. In Mode 1-2, the UE may transmit the CQI and the PMI value of each subband. At this time, the size of each subband may be changed according to system bandwidth.

In mode 2-0, the UE may select M preferred subbands with respect to the set S specified at the higher layer or the system bandwidth. The UE may generate one CQI value on the assumption that data is transmitted with respect to the selected M subbands. The UE preferably reports one CQI (wideband CQI) value with respect to the set S or the system bandwidth. The UE defines the CQI value of each codeword in the form of a difference if a plurality of codewords is present with respect to the selected M subbands.

At this time, the differential CQI value is determined by a difference between an index corresponding to the CQI value of the selected M subbands and a wideband CQI (WB-CQI) index.

In Mode 2-0, the UE may transmit a CQI value generated with respect to a specified set S or an entire set and one CQI value for the selected M subbands to the BS. At this time, the size of the subband and the M value may be changed according to system bandwidth.

In Mode 2-2, the UE may simultaneously select the locations of M preferred subbands and a single precoding matrix for the M preferred subbands on the assumption that data is transmitted via the M preferred subbands. At this time, the CQI value for the M preferred subbands is defined per codeword. In addition, the UE further generates a wideband CQI value with respect to the specified set S or the system bandwidth.

In Mode 2-2, the UE may transmit information about the locations of the M preferred subbands, one CQI value for the selected M subbands, a single PMI for the M preferred subbands, a wideband PMI and a wideband CQI value to the BS. At this time, the size of the subband and the M value may be changed according to system bandwidth.

In Mode 3-0, the UE generates a wideband CQI value. The UE generates the CQI value for each subband on the assumption that data is transmitted via each subband. At this time, even in case of RI>1, the CQI value indicates only the CQI value for a first codeword.

In Mode 3-1, the UE generates a single precoding matrix with respect to the specified set S or the system bandwidth. The UE generates a subband CQI on a per codeword basis on the assumption of the single precoding matrix generated with respect to each subband. In addition, the UE may generate a wideband CQI on the assumption of a single precoding matrix. The CQI value of each subband may be expressed in the form of a difference. The subband CQI value is calculated by a difference between a subband CQI index and a wideband CQI index. At this time, the size of the subband may be changed according to system bandwidth.

In Mode 3-2, the UE generate a precoding matrix for each subband instead of a single precoding matrix for system bandwidth, to be compared with Mode 3-1.

2) Periodic CQI/PMI/RI Transmission Via PUCCH

The UE may periodically transmit the CSI (e.g., CQI/PMI/RI information) to the BS via the PUCCH. If the UE receives a control signal for requesting transmission of user data, the UE may transmit the CQI via the PUCCH. Even when the control signal is transmitted via the PUSCH, the CQI/PMI/RI may be transmitted using one of the modes defined in Table 7 below.

TABLE 7

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selection (subband CQI) | Mode 2-0 | Mode 2-1 |

The UE may have the transmission modes shown in Table 7. Referring to Table 7, in Mode 2-0 and Mode 2-1, a bandwidth (BP) part is a set of subbands continuously located in a frequency domain and may cover a system bandwidth or a specified set S. In Table 7, the size of each subband, the size of the BP and the number of BPs may be changed according to system bandwidth. In addition, the UE transmits the CQI in a frequency domain in ascending order per BP so as to cover the system bandwidth or the specified set S.

According to a transmission combination of the CQI/PMI/RI, the UE may have the following four transmission types.

i) Type 1: A subband CQI (SB-CQI) of Mode 2-0 and Mode 2-1 is transmitted.

ii) Type 1a: A subband CQI and a second PMI are transmitted.

iii) Type 2, Type 2b, Type 2c: A wideband CQI and a PMI (WB-CQI/PMI) are transmitted.

iv) Type 2a: A wideband PMI is transmitted.

v) Type 3: An RI is transmitted.

vi) Type 4: A wideband CQI is transmitted.

vii) Type 5: An RI and a wideband PMI are transmitted.

viii) Type 6: An RI and a PTI are transmitted.

If the UE transmits the RI and the wideband CQI/PMI, the CQI/PMI is transmitted in subframes having different offsets and periodicities. In addition, if the RI and the wideband CQI/PMI should be transmitted in the same subframe, the CQI/PMI is not transmitted.

When a plurality of nodes transmit and receive a signal in a wireless communication system operating on an unlicensed band, the present invention proposes a method of configuring an LBT (listen before talk) operation or a time period capable of transmitting a signal according to each of a plurality of the nodes, configuring a priority level according to the time period, and performing a differential LBT operation according to the priority level.

Recently, with the advent of a smart device, data traffic is considerably increasing. As a result, a next generation wireless communication system such as 3GPP LTE-A is trying to find ways to efficiently utilizing a limited frequency band. In particular, the next generation wireless communication system considers managing a cellular network on such an unlicensed band as 2.4 GHz or 5 GHz. The unlicensed band regulates each of communication nodes to perform wireless transmission and reception based on an LBT operation such as CCS (clear channel assessment) and the like.

Figure 5:
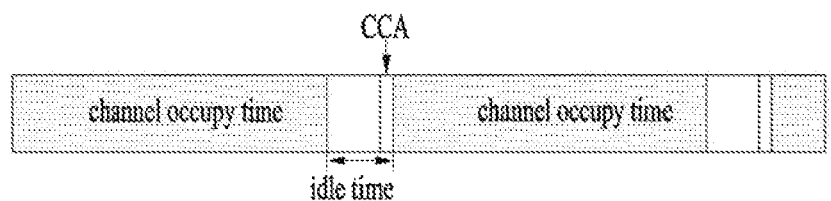
FIG. 5 is a diagram for an example of an LBT (listen before talk)-based channel access operation according to a FBE (frame based equipment)

For example, regulation of Europe illustrates two types of LBT-based channel access operation respectively referred to as FBE (frame based equipment) and LBE (load based equipment). The FBE configures a single frame using channel occupancy time (e.g., 1-10 ms) corresponding to time capable of maintaining transmission when a communication node succeeds in accessing a channel and idle time corresponding to the minimum 5% of the channel occupancy time. The CCA is defined as an operation of observing a channel for at least 20 µs of the last part of the idle time. In this case, a communication node periodically performs the CCA in a unit of the frame. If a channel is unoccupied, the communication node transmits data during the channel occupancy time. If a channel is occupied, the communication node waits until a CCA slot of a next period while postponing transmission. FIG. 5 shows an example of the FBE operation.

Figure 6:
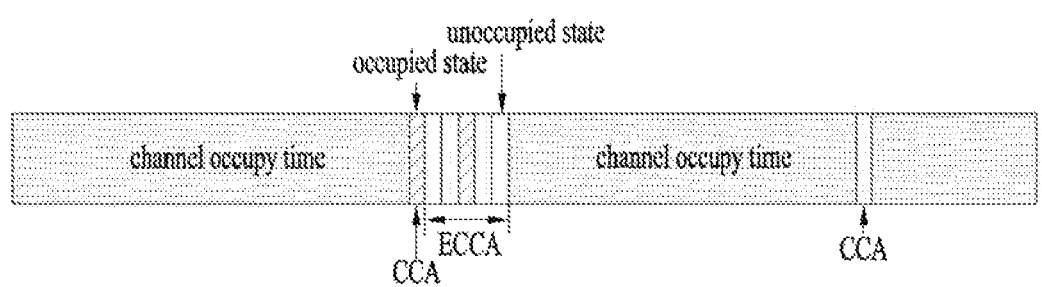
FIG. 6 is a diagram for an example of an LBT (listen before talk)-based channel access operation according to an LBE (load based equipment)

Meanwhile, in case of the LBE, a communication node configures a value of $q \in \{4, 5, \ldots, 32\}$ first and performs CCA on a single slot. If a channel is unoccupied in the first CCA slot, the communication node can transmit data by securing channel occupancy time as much as a length of (13/32)q ms. If a channel is occupied in the first CCA slot, the communication node randomly selects a value of $N \in \{1, 2, \ldots, q\}$, stores the selected value as an initial value of a counter, and senses a channel state in a unit of a CCA slot. If a channel is unoccupied in a specific CCA slot, the communication node reduces the value stored in the counter by 1. If the value stored in the counter becomes 0, a user equipment (UE) can transmit data with channel occupancy time as much as a length of (13/32)q ms. FIG. 6 shows an example of the LBE operation.

In the example, an occupied state of a channel or an unoccupied state of the channel can be determined based on whether or not reception power exceeds a prescribed threshold in a CCA slot. For example, according to the Wi-Fi standard (e.g., 801.11ac), a CCA threshold is regulated by −62 dBm and −82 dBm for a non-Wi-Fi signal and a Wi-Fi signal, respectively. In particular, if a signal rather than a Wi-Fi signal is received with power equal to or greater than −62 dBm, an STA (station) or an AP (access point) does not perform signal transmission to avoid interference occurrence. Meanwhile, a wireless communication system such as 3GPP LTE-A, and the like, considers a method of combining a cell operating on a licensed band (hereinafter, L-cell) and a cell operating on an unlicensed band (hereinafter, U-cell) with each other using a CA (carrier aggregation) technique and a method of performing LBT-based DL/UL transmission in the U-cell. In this case, in case of UL, it may be preferable to apply the FBE operation among the LBT operations due to a problem of HARQ process timing.

Meanwhile, a wireless communication system such as 3GPP LTE and the like is considering a method of supporting not only DL transmission but also UL transmission in a U-cell operating on the unlicensed band. If it is assumed that UL control information is transmitted to an L-cell only in consideration of reliability, since there is no restriction on UL transmission timing due to transmission of UL control information such as HARQ-ACK, and the like in the aspect of a specific single U-cell, it may consider a method of flexibly performing DL or UL transmission according to DL or UL traffic amount. However, in the aspect of a network consisting of a plurality of U-cells, it is preferable to identically configure a time period capable of performing DL transmission and a time period capable of performing UL transmission between U-cells in consideration of a DL-to-UL interference problem or a UL-to-DL interference problem between the adjacent U-cells. As an embodiment of the DL-to-UL interference problem or the UL-to-DL interference problem, as shown in FIG. 7, assume a situation that a U-cell 1 performs DL transmission on a UE 1 and a UE 2 performs UL transmission on a U-cell 2.

Figure 7:
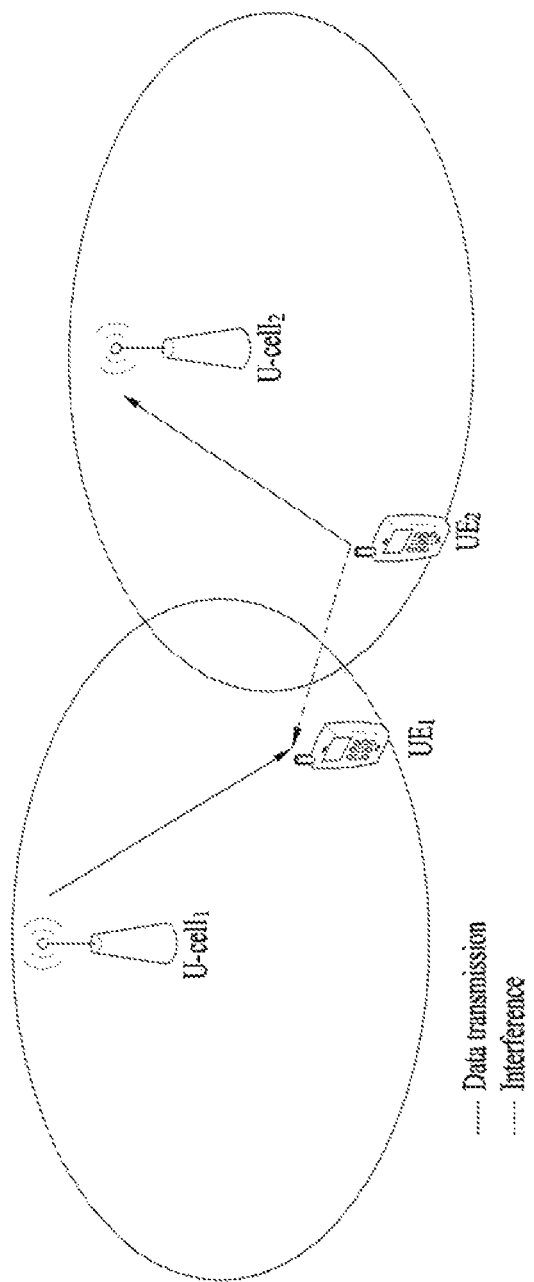
FIG. 7 is a diagram for inter-node interference in a U-cell.

In this case, as shown in FIG. 7, if the UE 2 performs UL transmission in the vicinity of the UE 1, a signal of the UL transmission may act as serious UL-to-DL interference when the UE 1 performs a DL reception procedure.

As a method of solving the problem shown in FIG. 7, it may be able to configure U-cells belonging to a network managed by the same operator to have the same time period capable of performing DL transmission and the same time period capable of performing UL transmission. In this case, if DL traffic does not exist, the time period capable of performing DL transmission is unable to perform DL transmission. If UL traffic does not exist, the time period capable of performing UL is unable to perform UL transmission. Hence, efficiency of utilizing a resource is decreased. In particular, since a signal is opportunistically transmitted in an unlicensed band due to an LBT operation, it is unable to guarantee that DL traffic (or UL traffic) is always transmitted in the time period capable of performing DL transmission (or the time period capable of performing UL transmission). As a result, a ratio between DL traffic and UL traffic accumulated in a buffer may considerably changes according to time. Hence, in order to mitigate the problem, the present invention considers a method for an eNB to configure a time period of which DL transmission has priority and a time period of which UL transmission has priority and differentiate an LBT operation for the DL transmission and an LBT operation for the UL transmission according to priority in each of the transmission periods. In this case, if a channel is in an unoccupied state in the time period of which the DL transmission has priority (or, the time period of which the UL transmission has priority), it may be able to increase resource utilization by opportunistically permitting UL transmission (or DL transmission).

More generally, when a plurality of nodes configured to transmit and receive a signal exist, the present invention proposes a method of performing a differential LBT operation according to transmission priority in a specific time period which is configured according to each of a plurality of the nodes. In this case, a node capable of transmitting a control signal to other nodes is defined as a center node. For example, an eNB and a UE may correspond to a DL transmission node and a UL transmission node, respectively, in a cellular system. In this case, the eNB may become a center node in a cell. In the following, an operation in an LTE system is explained as a specific embodiment of the present invention. Yet, the operation described in the present invention can be extensively applied to a random wireless communication system performing an LBT operation.

Method of Configuring Priority

Method of Semi-Statically Configuring Priority

The present invention proposes a method for a network (or center node) to semi-statically configure a plurality of time periods capable of performing signal transmission (hereinafter, transmission capable time period) according to an LBT operation in accordance with a node and a method of configuring one of a plurality of (predetermined) priority levels according to each of a plurality of the time periods. In this case, the transmission capable time period can be configured according to a time reference (e.g., synchronization timing for receiving data) of each node and can be configured to be repeated with a prescribed time period. And, a value of a priority level and priority may be in proportion or inverse proportion to each other.

For example, in LTE system according to the embodiment of the present invention, an eNB is defined as a DL transmission node and a UE is defined as a UL transmission node. The eNB is able to set two transmission capable time periods (e.g., A and B) repeated with a certain time interval to the UE via such a higher layer signal as RRC, or the like. Two priority levels including HIGH and LOW can be promised between the eNB and the UE. Priority of a DL transmission node and priority of a UL transmission node can be respectively configured as HIGH and LOW in the transmission capable time period A. On the contrary, priority of the DL transmission node and priority of the UL transmission node can be respectively configured as LOW and HIGH in the transmission capable time period B.

Method of Dynamically Configuring Priority

The present invention proposes a method for a network (or center node) to inform a node of a grant for signal transmission via dynamic control signaling and a method for the network to inform a node of an indicator (or, a bit field) for selecting one of a plurality of priority levels for the transmission in a manner of including the indicator in the dynamic control signaling. In this case, having received the dynamic control signaling, the node can control an LBT operation according to the priority indicated by the control signaling when a corresponding signal is transmitted.

When an LBT operation managed by a heterogeneous network or a network managed by a different operator is considered in an unlicensed band, a level of contention for securing a channel may considerably change according to time. Hence, if the transmission priority is dynamically configured according to transmission timing, it may be preferable in that it is able to flexibly cope with LBT operations of neighboring nodes. For example, in LTE system according to the embodiment of the present invention, when an eNB forwards DCI (dynamic control information) for UL transmission to a UE, a bit field belonging to the DCI can inform the UE of transmission priority for the UL transmission. Or, the eNB may inform the UE of priority via a MAC signal.

Method of Configuring LBT Operation According to Transmission Priority

Change of LBT Operation

Configuration of Period for which Initial CCA (or ECCA) is Performed According to Transmission Priority According to a detail embodiment of the present invention, when a transmission priority level per node is configured at specific timing, the present invention proposes a method of configuring a (periodic) time period capable of performing initial CCA (or ECCA) according to the transmission priority level. For example, when there exists timing capable of transmitting a signal of a node of high priority, timing of performing initial CCA of a node of low transmission priority can be configured to be appeared after a prescribed delay (defer) time compared to the timing capable of transmitting the signal.

Similar to the object of the present invention, in order to make each node opportunistically transmit a signal while transmission priority is maintained at specific timing to mitigate inter-node interference (e.g., DL-to-UL, UL-to-DL interference) in a U-cell, it is preferable that a node of low transmission priority transmits a signal of the node after checking whether or not a node of high transmission priority transmits a signal. Hence, the present invention proposes a method of configuring a period for which initial CCA (or ECCA) is performed according to each node in accordance with transmission priority.

Figure 8:
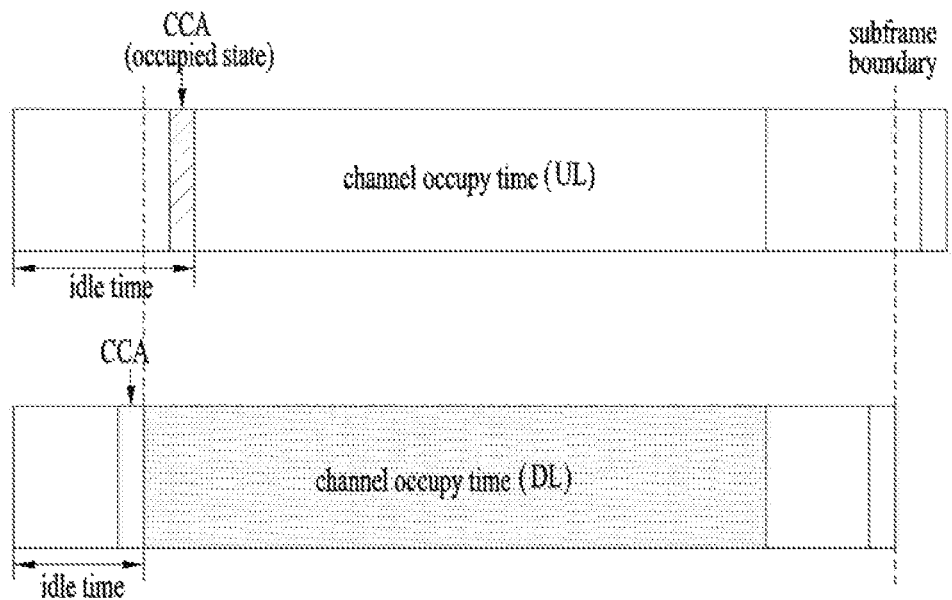
FIG. 8 is a diagram for CCA timing according to UL/DL transmission priority according to one embodiment of the present invention.

For example, FIG. 8 shows a method of configuring a position of CCA for performing UL transmission to be appeared after DL transmission timing in a time period where DL transmission has priority higher than that of UL transmission when LBT of a FBE scheme is performed in LTE system according to one embodiment of the present invention.

As a different example of the operation, when there exists timing capable of transmitting a signal of a node of high priority, timing at which initial CCA of a node of low transmission priority ends can be configured to be appeared after a prescribed delay (defer) time compared to the timing capable of transmitting the signal. In this case, a partial region of the period for which the initial CCA is performed may exist prior to the timing of transmitting the signal and the remaining region may exist after the timing capable of transmitting the signal of the node of high priority.

Configuration of LBT-Related Parameter According to Transmission Priority

According to detail embodiment of the present invention, when a transmission priority level is configured according to a node at specific timing, the present invention proposes a method of changing an LBT-related parameter configuration according to the priority level. Specifically, LBT-related parameters can be defined as follows.

[LBT-Related Parameters]
(1) Length of CCA slot
(2) Size of CCA threshold
(3) Value of back-off counter
(4) Maximum COT (channel occupancy time)

Figure 9:
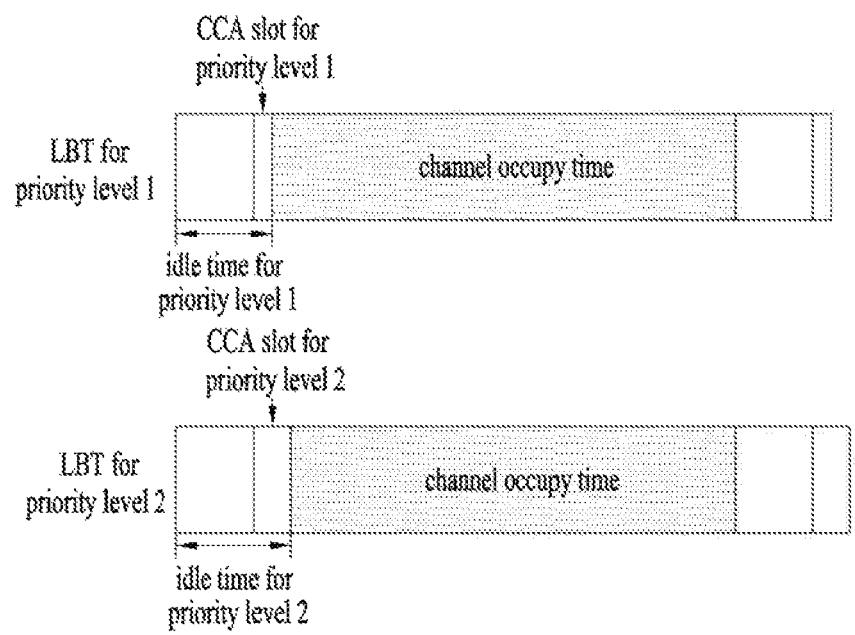
FIG. 9 is a diagram for CCA timing according to UL/DL transmission priority according to one embodiment of the present invention.

More specifically, the parameter values can be configured to be proportional or inverse proportional to a transmission priority level. The abovementioned operation corresponds to an operation of putting transmission priority by configuring an LBT-related parameter of a node of low priority to be relatively unfavorable to channel acquisition. For example, FIG. 9 shows a method of configuring idle time and a length of a CCA slot according to a value of a transmission priority level when an LBT scheme follows a FBE.

In this case, a network (or a center node) can forward configuration information of LBT-related parameters according to the transmission priority to each node in a form of control signaling. Or, the information can be exchanged between nodes.

Additional LBT Operation

Configuration of Defer Time According to Transmission Priority and Period for which Additional LBT is Performed According to detail embodiment of the present invention, when a transmission priority level according to a node is configured at specific timing, if a node performs a default LBT operation and it is determined as a channel is in an occupied state, signal transmission is deferred during defer time, which is determined according to a transmission priority level at transmission timing, and an additional LBT operation can be performed within the defer time. In this case, it may follow one of schemes described in the following as an additional LBT scheme.

[Additional LBT Scheme]

(1) When CCA is performed on 1 CCA slot, if a channel is in an unoccupied state, signal transmission is performed. If the channel is in an occupied state, a default LBT operation is performed after the signal transmission is deferred as much as prescribed time.

(2) A back-off counter is configured and CCA is performed on a plurality of CCA slots. If the back-off counter is 0, signal transmission is performed.

A. (Optionally), if the back-off counter is not 0 within a predetermined time period, the default LBT operation is performed after the signal transmission is deferred as much as prescribed time.

And, a transmission priority level can be applied to an additional LBT operation in a form of one of the following options or a combination thereof.

[Additional CCA According to Transmission Priority]

Figure 10:
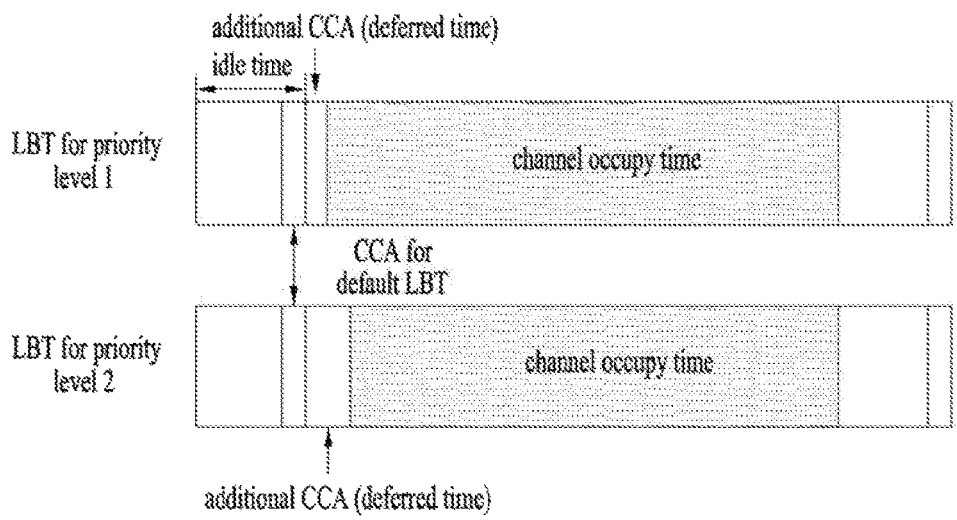
FIG. 10 is a diagram for CCA timing according to UL/DL transmission priority according to one embodiment of the present invention.

(1) Configure a length of a CCA slot in proportion to (in reverse proportion to) a value of a transmission priority level (2) Configure a CCA threshold in proportion to (in reverse proportion to) a value of a transmission priority level (3) Configure a back-off counter in proportion to (in reverse proportion to) a value of a transmission priority level For example, when a transmission priority level is applied to a node following a FBE scheme, an LBT operation can be represented as FIG. 10.

FIG. 10 shows an example of an operation that a length of a CCA slot is increasing according to the increase of a value of a transmission priority level when an additional LBT operation is defined by CCA performed on a single CCA slot. According to the example, as the transmission priority level has a bigger value, a period at which additional CCA is performed increases. As a result, probability of occupying a channel is decreasing. It may be able to control transmission of a node of high transmission priority to be performed prior to transmission of a node of low transmission priority using defer time according to a transmission priority level and controls the additional CCA to be performed during the defer time. By doing so, if the node of high transmission priority performs transmission, the node of low transmission priority recognizes a channel state as an occupied state during the additional CCA period, thereby preventing occurrence of interference. In this case, a value of the transmission priority level is reverse proportion to actual transmission priority in the abovementioned example. In particular, as the transmission priority is higher, the value of the transmission priority level is configured to be low.

In this case, a network (or a center node) can forward the defer time according to the transmission priority and configuration information on the additional LBT operation to each node in a form of control signaling. Or, the information can be exchanged between nodes.

Configuration of Additional Idle Time According to Transmission Priority

When a transmission priority level is configured according to a node at specific timing, a method for a node to apply additional idle time, which is determined according to a transmission priority level at transmission timing, to idle time configured according to a default LBT operation is proposed according to specific embodiment of the present invention. In this case, the transmission priority level can be applied to the additional idle time as follows.

[Additional Idle Time According to Transmission Priority]

Figure 11:
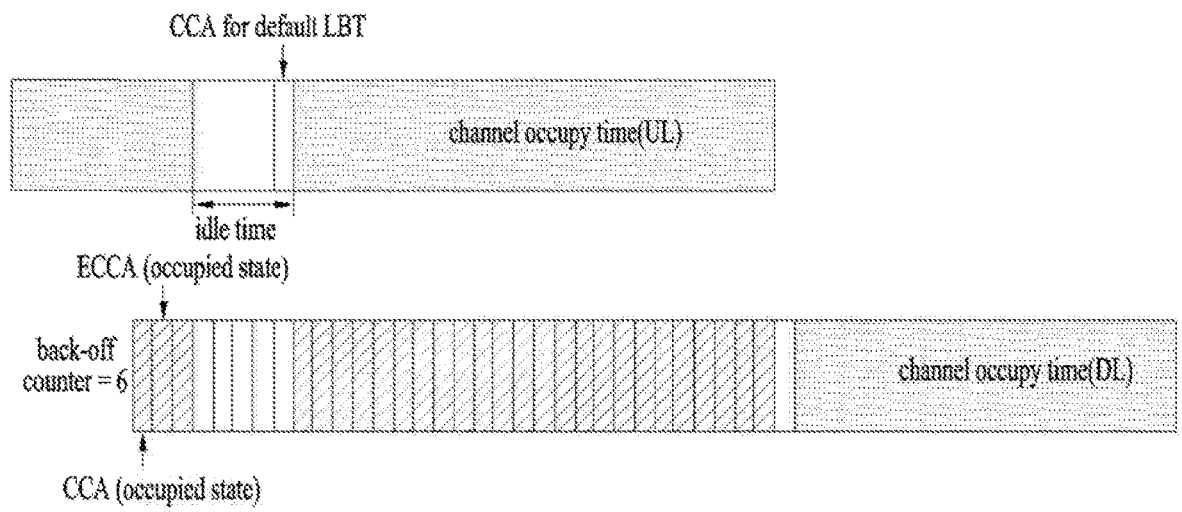
FIG. 11 is a diagram for CCA timing according to UL/DL transmission priority according to one embodiment of the present invention.

(1) Configure a length of idle time in proportion to (or in reverse proportion to) a value of a transmission priority level For example, when a U-cell of LTE system is managed in an unlicensed band, assume that UL transmission follows a FBE scheme and DL transmission follows an LBE scheme. And, assume that DL transmission is configured to have priority over UL transmission in a specific time period and UL opportunistic transmission is permitted. Then, as shown in FIG. 11, since the opportunistic transmission of UL influences on CCA or ECCE of DL, the UL transmission may occupy a channel with a higher probability compared to the DL transmission.

Hence, in order to solve the abovementioned problem, it is necessary to put priority on the DL transmission. To this end, one embodiment of the present invention proposes a method of assigning additional idle time according to a transmission priority. More specifically, as shown in FIG. 12, it may be able to assign additional idle time to the UL transmission of relatively low priority shown in FIG. 11.

Figure 12:
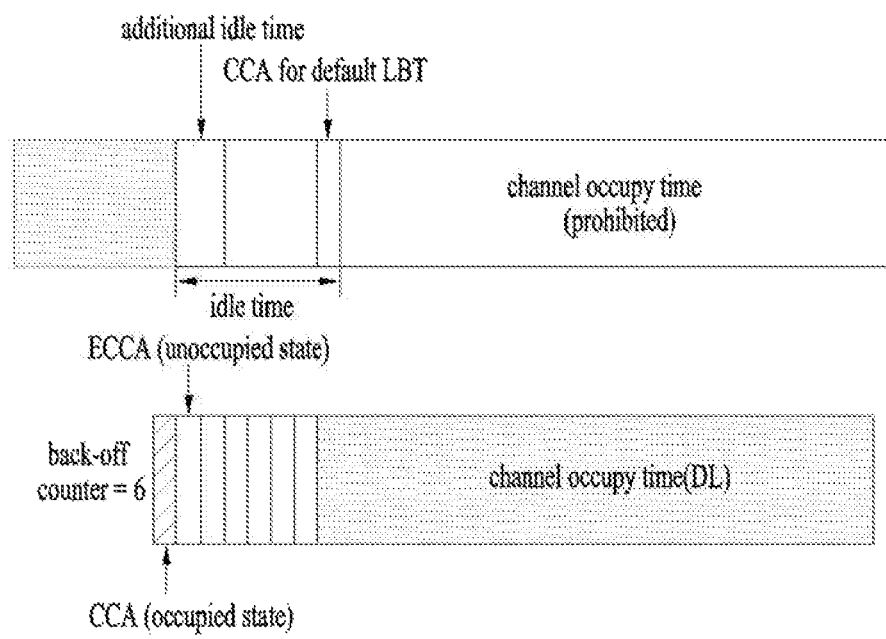
FIG. 12 is a diagram for CCA timing according to UL/DL transmission priority according to one embodiment of the present invention.

As shown in FIG. 12, if additional idle time is assigned according to priority, since it is able to quickly exhaust a back-off counter of an LBE operation for performing DL transmission after UL transmission is completed, it may be able to relatively raise priority of the DL transmission.

In this case, a network (or a center node) can forward configuration information on the additional idle time according to the priority to each node in a form of control signaling. Or, the information can be exchanged between nodes.

Method of Configuring Penalty for LBT Operation

Configuration of DTX Period According to Priority

When a transmission priority level is configured according to a node at specific timing, a method of configuring a (periodic) DTX (discontinuous transmission) period for restricting signal transmission of a node according to the transmission priority level is proposed according to specific embodiment of the present invention. In this case, the DTX period can be configured in terms of a signal transmission unit (e.g., subframe, OFDM symbol, SC-FDMA symbol) according to data reception timing or data transmission timing of a node.

In general, since an LBT operation in an unlicensed band is defined by a regulation of each country and a regulation of a region, it may consider a case that each node freely implements the LBT operation under a condition that satisfies the regulation. In this case, it may consider a method of configuring an operation to be applied to an LBT operation as a penalty as a method of controlling transmission priority per node without having a technical limit for the LBT operation. More specifically, a DTX period per node can be configured according to transmission priority as one of the penalty operations. For example, a transmission priority level can be applied to the DTX period as follows.

[DTX Period According to Transmission Priority]

Figure 13:
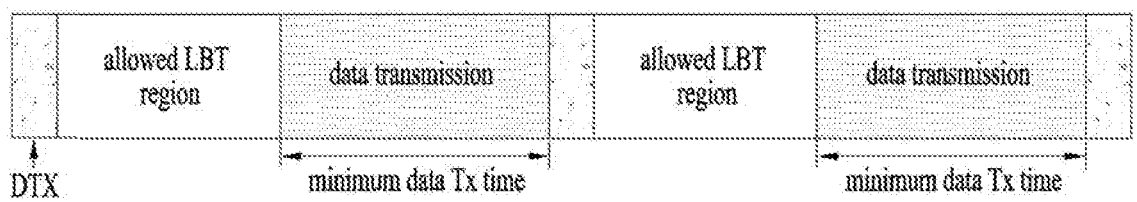
FIG. 13 is a diagram for a period allowed to perform CCA by a DTX period configuration according to transmission priority in accordance with one embodiment of the present invention.

(1) Configure a length of a DTX period in proportion to (in reverse proportion to) a value of a transmission priority level (2) Configure an interval between DTX periods in proportion to (in reverse proportion to) a value of a transmission priority level For example, when a DTX period is set to a specific node, the node delays signal transmission to make other nodes perform an LBT operation in the DTX period irrespective of whether or not a previous LBT operation is successful. Hence, a penalty is assigned to the LBT operation. As a result, priority in transmitting a signal becomes relatively low. In this case, if a network (or a center node) is able to set a limit on a minimum length for a data transmission length of a node, as shown in FIG. 13, it may be able to indirectly set a limit on a position of a period allowed to perform CCA. In particular, although a node determines a channel state as an unoccupied state at specific timing according to an LBT operation, if the node is unable to perform data transmission as much as a minimum length due to a DTX period, the node postpones signal transmission and resumes the LBT operation after the DTX period. Transmission time of a reservation signal for simply occupying a channel can be excluded from the data transmission length.

In this case, a network (or a center node) can forward information on the DTX period according to the priority to each node in a form of control signaling. Or, the information can be exchanged between nodes.

Configuration of LBT Operation Restricted Period According to Transmission Priority When a transmission priority level is configured according to a node at specific timing, a method of configuring a (periodic) time period for restricting an LBT operation of a node according to the transmission priority level is proposed according to specific embodiment of the present invention. In this case, a node does not perform CCA in the time period for restricting the LBT operation. If a node has a back-off counter, the node maintains a value of the back-off counter until the timing at which the LBT operation restricted period ends. More specifically, the transmission priority level can be applied to the LBT operation restricted period as follows.

[LBT Operation Restricted Period According to Transmission Priority]

(1) Configure a length of an LBT operation restricted period in proportion to (in reverse proportion to) a value of a transmission priority level (2) Configure an interval between LBT operation restricted periods in proportion to (in reverse proportion to) a value of a transmission priority level As a different operation of giving a penalty to an LBT operation, it may consider a method of setting a limit on a time period allowed to perform CCA. For example, if it is able to finish signal transmission of normal nodes at specific timing (e.g., a subframe), signal transmission transmitted by nodes of relatively low priority can be configured to be performed after prescribed time is elapsed from the specific timing by setting a limit on an LBT operation. Then, the normal nodes can perform the LBT operation immediately after transmission of a specific normal node is finished. On the contrary, the nodes of relatively low priority are able to perform the LBT operation after waiting for prescribed time. Hence, the nodes of relatively low priority have a relatively low probability of occupying a channel.

Figure 14:
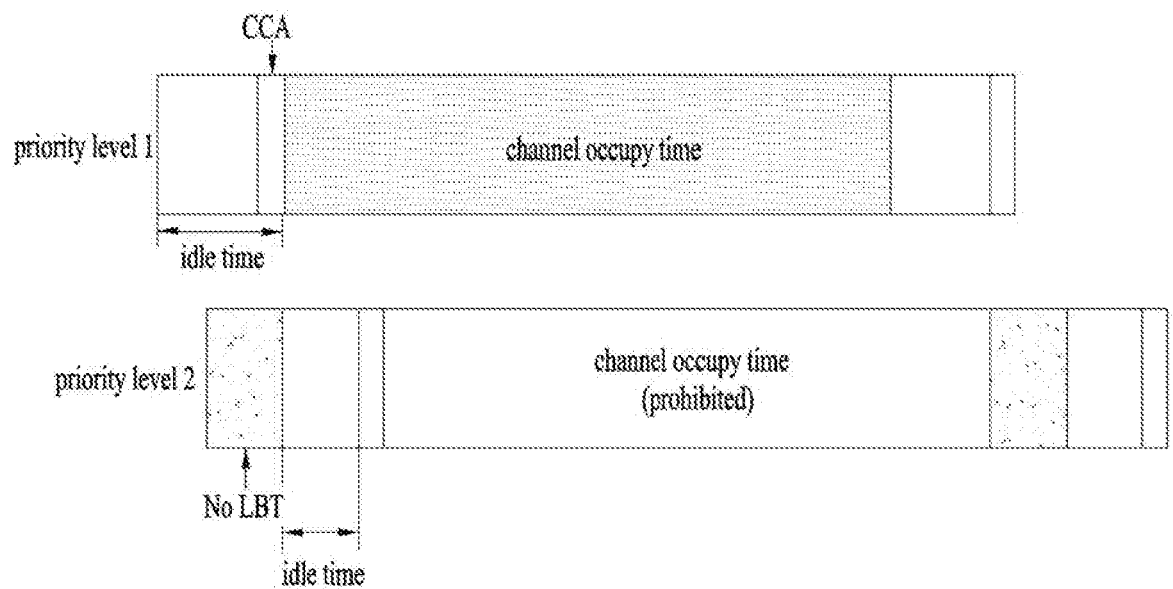
FIG. 14 is a diagram for an example of setting an LBT restriction period to a node of low transmission priority according to one embodiment of the present invention.

In this case, it may be able to describe as the LBT operation restricted period sets defer time according to transmission timing. For example, in LTE system according to the embodiment of the present invention, it may be able to configure an LBT operation to be performed after defer time which is determined by a transmission priority level from every subframe boundary. In this case, in case of having a back-off counter, a value of the back-off counter can be maintained during the defer time. FIG. 14 shows an example of setting an LBT operation restricted period to a node of low transmission priority when a node of different transmission priority performs an LBT operation according to a FBE scheme.

In this case, a network (or a center node) can forward information on the LBT operation restricted period according to the transmission priority to each node in a form of control signaling. Or, the information can be exchanged between nodes.

Method of Configuring Time Offset for Transmission Start Timing

When a transmission priority level is configured according to a node at specific timing, a method of configuring a time offset for transmission start timing of a node according to the transmission priority level is proposed according to specific embodiment of the present invention.

In LTE system according to the specific embodiment of the present invention, UL transmission is designed to be performed prior to DL transmission as much as TA (timing advance) time. Meanwhile, a UL grant for the UL transmission is indicated by an eNB in advance in an $n-k^{th}$ subframe. In particular, when a UE performs CCA for performing transmission in an $n^{th}$ subframe, if a channel is in an occupied state, although the UE receives a UL grant, the UE is unable to perform UL transmission. As a result, a resource can be unnecessarily wasted. Preferably, it may consider a method described in the following. If a specific transmission node is able to recognize that a different transmission node has failed to perform UL transmission in the $n^{th}$ subframe via CCA, the specific transmission node is able to perform DL transmission based on the recognition.

In order to support the abovementioned operation, the present invention proposes a method of performing UL transmission by advancing the UL transmission as much as a value (e.g., 1 SC-FDMA symbol) greater than TA (time alignment) to identify whether or not the UL transmission is performed in the same subframe in a CCA period prior to DL transmission performed in a corresponding subframe (e.g., $n^{th}$ subframe). In particular, a network (or, a center node) sets a time offset for transmission start timing of each node irrespective of TA and may be able to indicate each node to apply a TA value and a time offset value at the same time.

Figure 15:
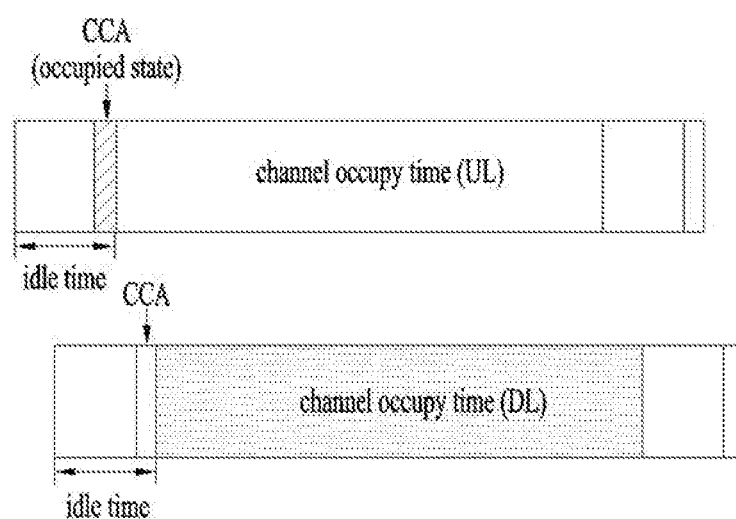
FIG. 15 is a diagram for UL/DL subframe timing to which a time offset is applied according to one embodiment of the present invention.

FIG. 15 is a diagram for an example that a time offset is applied to UL transmission and DL transmission according to one embodiment of the present invention.

Or, unlike the abovementioned example, in order to put priority on UL transmission, it may be able to make DL transmission timing appear after a legacy position by setting a time offset.

In this case, a network (or a center node) can forward information on the time offset for transmission start timing per node according to the transmission priority to each node in a form of control signaling. Or, the information can be exchanged between nodes.

Method of Configuring Rx-to-Tx/Tx-to-Rx Switching Timing for Random Timing Transmission Method According to Tx or Rx Indication When a node following an additional LBT operation, an LBT operation change, a penalty for a LBT operation, and the like exists according to a transmission priority level, the present invention proposes a method that a network (or a center node) indicates the node to perform a Tx (transmission) or an Rx (reception) operation in a random transmission unit (e.g., a subframe) and the node configures Rx-to-Tx and Tx-to-Rx switching timing (or a switching period) described in the following according to specific embodiment of the present invention. In this case, the node does not perform a data reception operation in the Rx-to-Tx switching period or the Tx-to-Rx switching period under the assumption that a different node (e.g., a network or a center node) did not transmit data to be received by the node to the node. And, the node does not perform a data transmission operation in the Rx-to-Tx switching period or the Tx-to-Rx switching period under the assumption that the network does not indicate the data transmission operation in the Rx-to-Tx switching period or the Tx-to-Rx switching period. In this case, assume that the node is able to know Tx indication for an $n^{th}$ transmission unit at the timing of n−k (k≥1).

[Rx-to-Tx Switching Timing]

(1) When Rx indication for an $n^{th}$ transmission unit exists and Tx indication for an $n+1^{th}$ transmission unit exists, A. A rear region belonging to the $n^{th}$ transmission unit is configured as Rx-to-Tx switching timing B. A front region belonging to the $n+1^{th}$ transmission unit is configured as Rx-to-Tx switching timing (2) When Tx indication or Rx indication for the $n^{th}$ transmission unit does not exist and Tx indication for the $n+1^{th}$ transmission unit exists, A. The rear region belonging to the $n^{th}$ transmission unit is configured as Rx-to-Tx switching timing B. The front region belonging to the $n+1^{th}$ transmission unit is configured as Rx-to-Tx switching timing

[Tx-to-Rx Switching Timing]

(1) When Tx indication for an $n^{th}$ transmission unit exists and Rx indication for an $n+1^{th}$ transmission unit exists, A. A rear region belonging to the $n^{th}$ transmission unit is configured as Tx-to-Rx switching timing B. A front region belonging to the $n+1^{th}$ transmission unit is configured as Tx-to-Rx switching timing (2) When Tx indication for the $n^{th}$ transmission unit exists and Tx indication or Rx indication for the $n+1^{th}$ transmission unit does not exist, A. The rear region belonging to the $n^{th}$ transmission unit is configured as Tx-to-Rx switching timing B. The front region belonging to the $n+1^{th}$ transmission unit is configured as Tx-to-Rx switching timing As mentioned in the foregoing description, when a network directly indicates the Tx-to-Rx or Rx-to-Tx switching timing via dynamic signaling, unless it is necessary to perform Tx-to-Rx or Rx-to-Tx switching with high frequency, it may cause unnecessary signaling overhead. Hence, the present invention proposes a method for a UE to configure switching timing according to a specific condition such as Tx or Rx indication for contiguous transmission units.

Figure 16:
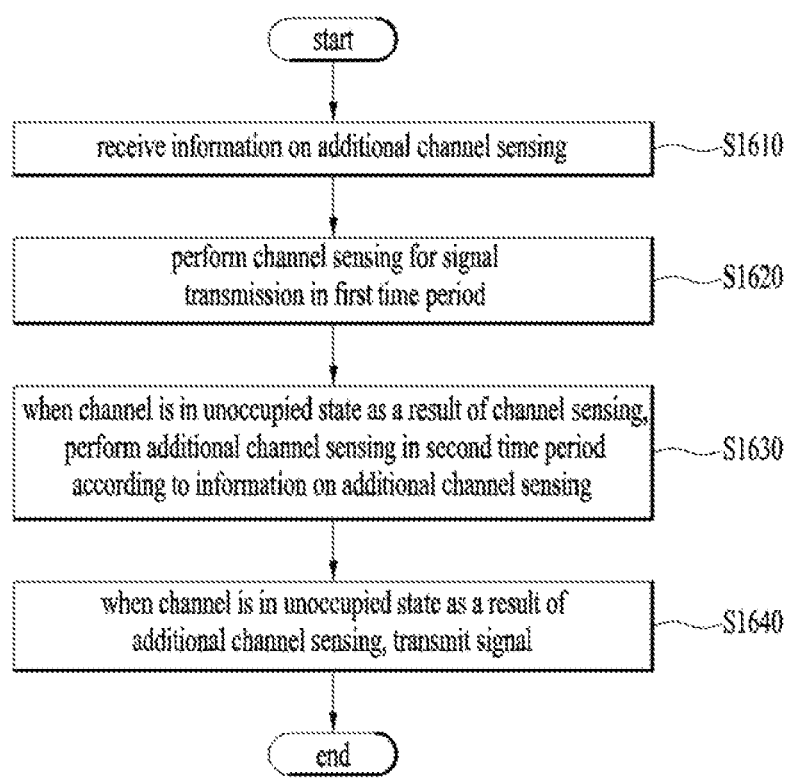
FIG. 16 is a flowchart for an operation according to an embodiment of the present invention.

FIG. 16 is a flowchart for an operation according to an embodiment of the present invention. FIG. 16 shows a method of transmitting an uplink signal in an unlicensed band in a wireless communication system. The method can be performed by a transmission node.

The transmission node can receive information on additional channel sensing from a center node [S1610]. The transmission node can perform channel sensing for transmitting a signal in a first time period [S1620]. As a result of the channel sensing, when a channel is in an unoccupied state, the transmission node may perform additional channel sensing in a second time period immediately after the first time period according to the information on the additional channel sensing [S1630]. In this case, a length of the second time period may be determined according to a transmission priority level of the transmission node. As a result of the additional channel sensing, when a channel is in an unoccupied state, the transmission node may transmit the signal [S1640].

Further, the first time period may be configured to be after a prescribed time from a time period allowed to perform transmission by a transmission node of a transmission priority level higher than that of the transmission node.

Further, a length of the second time period can be configured in proportion to or in reverse proportion to a value of the transmission priority level of the transmission node.

Further, when the second time period consists of a plurality of slots, the transmission node may sequentially perform channel sensing in each of a plurality of the slots. If a back-off counter value becomes 0, the transmission node may transmit a signal.

Further, the back-off counter value may be configured in proportion to or in reverse proportion to a value of the transmission priority level of the transmission node.

Further, the transmission node may receive information on a period for which signal transmission is restricted or a period for which channel sensing is restricted from the center node.

Further, a length and an interval of the period for which signal transmission is restricted or the period for which channel sensing is restricted may be configured in proportion to or in reverse proportion to a value of the transmission priority level of the transmission node.

Further, if a length of a minimum signal transmission period is secured according to the information on the period for which signal transmission is restricted, the transmission node may transmit the signal.

Further, when a signal to be transmitted by the transmission node corresponds to an uplink signal, if priority of the uplink signal is higher than priority of a downlink signal, a transmission timing of the uplink signal may be advanced as much as a predetermined time offset. If the priority of the uplink signal is lower than the priority of the downlink signal, the transmission timing of the uplink signal may be delayed as much as a predetermined time offset.

So far, the embodiments of the present invention have been briefly explained with reference to FIG. 16. Embodiments related to FIG. 16 can alternatively or additionally include at least a part of the aforementioned embodiment(s).

Figure 17:
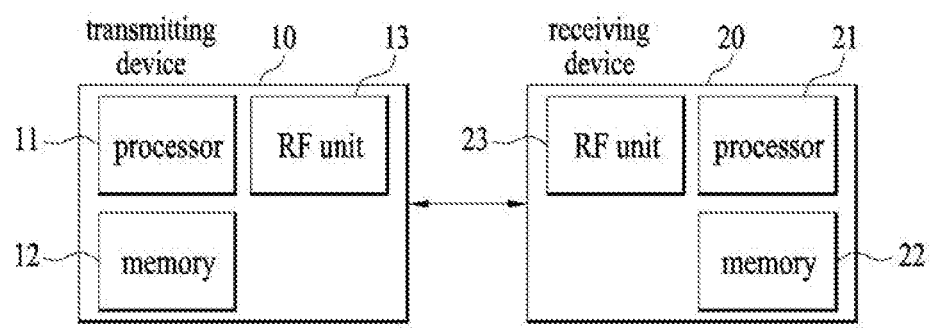
FIG. 17 is a block diagram of a device for implementing embodiment(s) of the present invention.

FIG. 17 is a block diagram of a transmitting device 10 and a receiving device 20 configured to implement exemplary embodiments of the present invention. Referring to FIG. 17, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been, given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a relay and a base station (BS).

What is claimed is:

1. A method of transmitting a signal in an unlicensed band, which is transmitted by a transmission node in a wireless communication system, the method comprising:
   receiving information on additional channel sensing from a center node, information on a period of restricted signal transmission and information on a length of a minimum signal transmission period;
   performing channel sensing for transmitting the signal within a first time period;
   performing the additional channel sensing within a second time period immediately after the first time period according to the information on the additional channel sensing when a channel is in an unoccupied state as a result of the channel sensing;

transmitting the signal when a channel is in an unoccupied state as a result of the additional channel sensing and when the length of the minimum signal transmission period finishes before the period of restricted signal transmission according to the information on the period of restricted signal transmission; and reserving the signal when the channel is in the occupied state as a result of the additional channel sensing or when the length of the minimum signal transmission period finishes after the period of restricted signal transmission according to the information on the period of restricted signal transmission, wherein a length of the second time period and the period of restricted signal transmission are determined according to a transmission priority level of the transmission node, wherein the period of restricted signal transmission has a length and an interval, and wherein the period of restricted signal transmission is not for channel sensing of the transmission node.

2. The method of claim 1, wherein the first time period is configured to be after a prescribed time from a transmission allowed time period of another transmission node having a transmission priority level higher than the transmission priority level of the transmission node.

3. The method of claim 1, wherein the length of the second time period is configured in proportion to or in reverse proportion to a value of the transmission priority level of the transmission node.

4. The method of claim 1, further comprising:
sequentially performing channel sensing in each of a plurality of slots when the second time period consists of a plurality of slots; and
transmitting the signal when a back-off counter value becomes 0.

5. The method of claim 4, wherein the back-off counter value is configured in proportion to or in reverse proportion to a value of the transmission priority level of the transmission node.

6. The method of claim 1, further comprising:
receiving information on a period of restricted channel sensing from the center node.

7. The method of claim 6, wherein the period of restricted signal transmission or the period of restricted channel sensing has a length and an interval configured in proportion to or in reverse proportion to a value of the transmission priority level of the transmission node.

8. The method of claim 1, wherein when the signal to be transmitted by the transmission node corresponds to an uplink signal, if priority of the uplink signal is higher than priority of a downlink signal, a transmission timing of the uplink signal is advanced as much as a predetermined time offset; and if the priority of the uplink signal is lower than the priority of the downlink signal, the transmission timing of the uplink signal is delayed as much as the predetermined time offset.

9. A transmission node for transmitting a signal in an unlicensed band in a wireless communication system, the transmission node comprising:
a transceiver; and a processor configured to:
control the transceiver to receive information on additional channel sensing from a center node, information on a period of restricted signal transmission and information on a length of minimum signal transmission period,
perform channel sensing for transmitting the signal within a first time period,
perform the additional channel sensing within a second time period immediately after the first time period according to the information on the additional channel sensing when a channel is in an unoccupied state as a result of the channel sensing,
control the transceiver to transmit the signal when a channel is in an unoccupied state as a result of the additional channel sensing and when the length of the minimum signal transmission period finishes before the period of restricted signal transmission according to the information on the period of restricted signal transmission, and
reserve the signal when the channel is in the occupied state as a result of the additional channel sensing or when the length of the minimum signal transmission period finishes after the period of restricted signal transmission according to the information on the period of restricted signal transmission,
wherein a length of the second time period and the period of restricted signal transmission are determined according to a transmission priority level of the transmission node, and
wherein the period of restricted signal transmission has a length and an interval, and
wherein the period of restricted signal transmission is not for channel sensing of the transmission node.

10. The transmission node of claim 9, wherein the first time period is configured to be after a prescribed time from a transmission allowed time period of a transmission node having a transmission priority level higher than the transmission priority level of the transmission node.

11. The transmission node of claim 9, wherein the length of the second time period is configured in proportion to or in reverse proportion to a value of the transmission priority level of the transmission node.

12. The transmission node of claim 9, wherein the processor is further configured to:
sequentially perform channel sensing in each of a plurality of slots when the second time period consists of a plurality of slots, and
transmit the signal when a back-off counter value becomes 0.

13. The transmission node of claim 12, wherein the back-off counter value is configured in proportion to or in reverse proportion to a value of the transmission priority level of the transmission node.

14. The transmission node of claim 9, wherein the processor is further configured to:
receive information on a period of restricted channel sensing from the center node.

15. The transmission node of claim 14, wherein the period of restricted signal transmission or the period of restricted channel sensing has a length and an interval configured in proportion to or in reverse proportion to a value of the transmission priority level of the transmission node.

16. The transmission node of claim 9, wherein when the signal to be transmitted by the transmission node corresponds to an uplink signal, if priority of the uplink signal is higher than priority of a downlink signal, a transmission timing of the uplink signal is advanced as much as a predetermined time offset; and if the priority of the uplink signal is lower than the priority of the downlink signal, the transmission timing of the uplink signal is delayed as much as the predetermined time offset.

* * * * *